(12) United States Patent  (10) Patent No.: US 7,599,878 B2
Atkinson et al.  (45) Date of Patent: Oct. 6, 2009

(54) METHOD, APPARATUS, AND SYSTEM FOR BIDDING IN ROUNDS

(75) Inventors: Scott W. Atkinson, Pittsburgh, PA (US); Anthony F. Bernard, Wexford, PA (US); William D. Rupp, Mt. Lebanon, PA (US); Daniel C. Heckmann, Pittsburgh, PA (US); Vincent F. Rago, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 1234 days.

(21) Appl. No.: 09/753,074

(22) Filed: Dec. 29, 2000

(65) Prior Publication Data

US 2001/0021923 A1    Sep. 13, 2001

Related U.S. Application Data

(63) Continuation-in-part of application No. 09/252,790, filed on Feb. 19, 1999, now Pat. No. 6,230,146.

(51) Int. Cl.
    *G06Q 40/00*  (2006.01)
(52) U.S. Cl. .......................................... 705/37; 705/35
(58) Field of Classification Search .................... 705/35, 705/37
    See application file for complete search history.

(56) References Cited

U.S. PATENT DOCUMENTS

| | | | |
|---|---|---|---|
| 3,581,072 A | 5/1971 | Nymeyer | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,842,275 A | 6/1989 | Tsatskin | |

(Continued)

FOREIGN PATENT DOCUMENTS

CA    2069955    6/1991

(Continued)

OTHER PUBLICATIONS

Besinger, Ken and Prial, Dunstan. "Art & Money—You Money Matters: Bidding 2000". The Wall Street Journal (Eastern Edition). New York, N.Y.: Jul. 31, 1998. p. W.10.*

(Continued)

*Primary Examiner*—Lalita M Hamilton
(74) *Attorney, Agent, or Firm*—Van Pelt, Yi & James LLP

(57) ABSTRACT

A method of conducting an auction in at least two rounds is disclosed. The method includes conducting the first auction round, applying a rule to an occurrence in the first auction round, and conducting the second auction round in accordance with the application of the rule to the occurrence in the first auction round. A system for conducting an auction in at least two rounds is also disclosed. The system includes a sponsor processor, a first bidder processor communicating with the sponsor processor, and a second bidder processor communicating with the sponsor processor. In the system, the sponsor processor contains instructions which, when executed by the processor, cause the processor to conduct the first auction round, apply a rule to an occurrence in the first auction round, and conduct a second auction round in accordance with the applied rule.

30 Claims, 6 Drawing Sheets

U.S. PATENT DOCUMENTS

| | | | |
|---|---|---|---|
| 4,845,625 | A | 7/1989 | Stannard |
| 4,992,940 | A | 2/1991 | Dworkin |
| 5,136,501 | A | 8/1992 | Silverman et al. |
| 5,193,056 | A | 3/1993 | Boes |
| 5,243,515 | A | 9/1993 | Lee |
| 5,297,032 | A | 3/1994 | Trojan et al. |
| 5,375,055 | A | 12/1994 | Togher et al. |
| 5,394,324 | A | 2/1995 | Clearwater |
| 5,402,336 | A | 3/1995 | Spiegelhoff et al. |
| 5,606,602 | A | 2/1997 | Johnson et al. |
| 5,629,982 | A | 5/1997 | Micali |
| 5,640,569 | A | 6/1997 | Miller et al. |
| 5,664,115 | A | 9/1997 | Fraser |
| 5,684,963 | A | 11/1997 | Clement |
| 5,689,652 | A | 11/1997 | Lupien et al. |
| 5,715,402 | A | 2/1998 | Popolo |
| 5,721,735 | A | 2/1998 | Smiroldo |
| 5,727,165 | A | 3/1998 | Ordish et al. |
| 5,758,327 | A | 5/1998 | Gardner et al. |
| 5,758,328 | A | 5/1998 | Giovannoli |
| 5,765,138 | A | 6/1998 | Aycock et al. |
| 5,774,873 | A | 6/1998 | Berent et al. |
| 5,794,207 | A | 8/1998 | Walker et al. |
| 5,794,219 | A | 8/1998 | Brown |
| 5,797,127 | A | 8/1998 | Walker et al. |
| 5,799,151 | A | 8/1998 | Hoffer |
| 5,799,285 | A | 8/1998 | Klingman |
| 5,802,502 | A | 9/1998 | Gell et al. |
| 5,803,500 | A | 9/1998 | Mossberg |
| 5,809,483 | A | 9/1998 | Broka et al. |
| 5,826,244 | A | 10/1998 | Huberman |
| 5,832,496 | A | 11/1998 | Anand et al. |
| 5,835,896 | A | 11/1998 | Fisher et al. |
| 5,862,223 | A | 1/1999 | Walker et al. |
| 5,890,138 | A | 3/1999 | Godin et al. |
| 5,897,621 | A | 4/1999 | Boesch et al. |
| 5,905,974 | A | 5/1999 | Fraser et al. |
| 5,905,975 | A | 5/1999 | Ausubel |
| 5,915,209 | A | 6/1999 | Lawrence |
| 5,966,699 | A | 10/1999 | Zandi |
| 6,006,194 | A * | 12/1999 | Merel .............................. 705/8 |
| 6,014,627 | A | 1/2000 | Togher et al. |
| 6,021,398 | A | 2/2000 | Ausubel |
| 6,023,685 | A | 2/2000 | Brett et al. |
| 6,026,383 | A * | 2/2000 | Ausubel ...................... 705/37 |
| 6,044,363 | A | 3/2000 | Mori et al. |
| 6,055,518 | A | 4/2000 | Franklin et al. |
| 6,058,379 | A | 5/2000 | Odom et al. |
| 6,061,663 | A | 5/2000 | Bloom et al. |
| 6,078,906 | A | 6/2000 | Huberman |
| 6,119,229 | A | 9/2000 | Martinez et al. |
| 6,151,589 | A | 11/2000 | Aggarwal et al. |
| 6,161,099 | A | 12/2000 | Harrington et al. |
| 6,199,050 | B1 | 3/2001 | Alaia et al. |
| 6,216,114 | B1 | 4/2001 | Alaia et al. |
| 6,223,167 | B1 | 4/2001 | Alaia et al. |
| 6,230,146 | B1 | 5/2001 | Alaia et al. |
| 6,230,147 | B1 | 5/2001 | Alaia et al. |
| 6,243,691 | B1 | 6/2001 | Fisher et al. |
| 6,266,652 | B1 | 7/2001 | Godin et al. |
| 6,285,989 | B1 | 9/2001 | Shoham |
| 6,366,891 | B1 | 4/2002 | Feinberg |
| 6,401,080 | B1 | 6/2002 | Bigus et al. |
| 6,408,283 | B1 | 6/2002 | Alaia et al. |
| 6,415,269 | B1 | 7/2002 | Dinwoodie |
| 6,449,601 | B1 | 9/2002 | Friendland et al. |
| 6,499,018 | B1 | 12/2002 | Alaia et al. |

FOREIGN PATENT DOCUMENTS

| | | |
|---|---|---|
| CA | 2080452 | 5/1993 |
| CA | 2298481 | 9/1998 |
| EP | 0399850 A | 11/1990 |
| JP | 409101994 A | 4/1997 |
| JP | 410078992 A | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |
| WO | WO 00/17797 | 3/2000 |
| WO | WO 00/79463 A1 | 12/2000 |
| WO | WO 01/54040 A1 | 7/2001 |

OTHER PUBLICATIONS

"Low Prices Lure Many to Online Auction Web Sites". Tampa Tribune. Tampa, Fla.: Jul. 8, 1997. p. 7.*

"New York City Sets Auction-Business Rules". New York Times. (Late Edition (East Coast)). New York, N.Y.: Oct. 24, 1986. p. C.22.*

Young, Doug. "The PCS Auction: A Post-Game Wrap-Up". Telecommunications. (Americas Edition). Dedham. Jul. 1995. vol. 29, Iss.7 p. 21, 3 pgs.*

"BroadVision Developing First Interactive Commerce Management System To Support Online Sales & Marketing Process; New Software Category Necessary to Interactive Network Architecture", Business Wire, p5150152, May 15, 1995.

"FairMarket Launches New Self-Serve Auctions", Business Wire, p6161495, Jun. 16, 1998.

Lee, "Do electronic marketplaces lower the price of goods?", Communications of the PCM, v41n1 pp. 73-80, Jan. 1998.

"Moai Technologies Introduces New categories of Business to Business Auction Software..", Business Editors and Computer writers, Mar. 16, 1998.

Kikuchi, et al., "Multi-Round Anonymous Auction Protocols", IEICE Trans. Inf. & Syst., vol. E82-D, No. 4, Apr. 1999.

"Online bidding software", Electronic Buyers' News, Issue 1072, p. 86, 1/6p, Aug. 25, 1997.

Sairamesh, et al., "Economic Framework for Pricing and Charging Digital Libraries", D-Lip Magazine, Feb. 1996.

"Sold!. . . To the Lowest Bidder", Computer Finance, v6, n2, Jul. 1995.

"Venture Capitalists Fund Two Massachusetts Internet Related Companies", Boston Globe, Jan. 14, 1998.

Vigoroso, "Buyers prepare for brave new world of e-commerce", Purchasing, v126, n6, pS4(1), Apr. 22, 1999.

Von der Fehr, et al., "Predatory bidding in sequential auctions", Oxford Economics Papers, v46, n3, p345(12), Jul. 1994.

"What you need to know to bid in FCC's narrowband auction", Washington Telecom News, v2, n26, p6(2), Jun. 27, 1994.

Malone, et al., "The Logic of Electronic Markets", Harvard Business Review, No. 893II, May-Jun. 1989.

Freemarkets™ Online, "Bidware Manual", Jun. 9, 1988.

Freemarkets Online™, "Online Industrial Market Making, An Overview of Purchasing Executives".

WebAuction.com, "How to Play", 1998.

Auction Sales, "Live Auctions Online", Sep. 1998.

Auction Port, "Online Auction Community—New Auctions Since Sep. 2, 1998", Jul. 1998.

OnSale, "How to Play", 1998.

u-Auction-It™, 1997.

Freemarkets Online™, "Homepage", 1998.

Andrews, "Auctions Catch the Interest of Hobbyists and Big Business", Aug. 24, 1998.

Associated Press, "Auction on Web is Buyer's Market", Apr. 6, 1998.

Steinert-Threlkeld, "New Watchwords: Let Sellers Beware", Jun. 1, 1998.

Woolley, "E-muscle", Mar. 9, 1998.

Associated Press, "FreeMarkets Takes Auction on Internet", Feb. 23, 1998.

Jahnke, "How Bazaar", CIO Web Business Magazine, Aug. 27, 1998.

Wilder, "What's Your Bid?—FreeMarkets' real-time online bidding technology lets clients drive down costs and improve product value", InformationWeek, Nov. 10, 1997.

Jean-Pierre Banatre, et al., "The Design and Building of Enchere, a Distributed Electronic Marketing System", Communications of the ACM, No. 1, Jan. 29, 1986.

Danny Cohen, "Computerized Commerce", Information Processing 89, (Aug. 28-Sep. 1, 1989.

FCC Auction, Procedures, Terms and Conditions retrieved from <http://wireless.fcc.gov/auctions/17/releases/Imdsbp_b.pdf>, Dec. 1997.

Fox, "*The Calm Way of Buying and Selling Livestock*," Sydney Morning Herald, Oct. 10, 1988.

M2 Presswire, "*ShoppersUniverse brings bidding to the Internet with the first ever on-line auction room*", Aug. 27, 1996, 2 pages.

Jackson, "*FCC Charges for Online Bidding*", Government Computer News, Jan. 27, 1997, 3 pages.

Newswire Press Release, "*Ingram Micro Launches Real-Time Online Auction Site*", Santa Ana, California, Feb. 11, 1998, 3 pages.

Business Wire "*Adauction.com Boosts Revenue with Enhanced Ad Auction Format; Morning and Afternoon Auctions and 'AutoExtend' Feature Maximize Opportunistic Media Buying on the Web*," May 4, 1998, 2 pages.

Woods, "*Excite Calls Online Auctions*", Newsbytes News Network, Jun. 10, 1998, 2 pages.

Kumar, M., et al., "*Internet Auctions*," Third Usenix Workshop on Electronic Commerce Proceedings, Boston, Massachusetts, Aug. 31-Sep. 3, 1998, 13 pages.

Reck, M., "*Types of Electronic Auctions*" Hochschule St. Gallen, in Schertler W., Schmid B., Tjoa A. & Werthner H. (Eds.) (1994) 'Information and Communication Technologies in Tourism', Springer-Verlag, 1994, 8 pages.

Wrigley, C., "*Design Criteria for Electronic Market Servers*", International Journal of Electronic Markets, vol. 7, No. 4, 1997, 5 pages.

Business Wire, "*Shawmut National Will Auction $46 Million In Commercial Real Estate in December*", Nov. 3, 1992, 2 pages.

Wurman et al., "*The Michigan Internet AuctionBot: A Configurable Auction Server for Human and Software Agents*," Artificial Intelligence Laboratory, University of Michigan (1998).

Buyer's Auction Online, "*New User Information*", http://buyersauction.com/userinfo.htm, 1998, 5 pages.

Ervin, K., "*Three Tree Point Property Draws $1.5 Million Bid: [FINAL Edition]*", Seattle Times, Feb. 11, 1998, 2 pages.

Rockoff, Todd E. and Groves, Michael, "Design of an Internet-based system for remote Dutch auctions," Internet Research: Electronic Networking Applications and Policy, vol. 5, No. 4, pp. 10-16 (1995).

\* cited by examiner

FIG. 4  AUCTION NETWORK

METHOD, APPARATUS, AND SYSTEM FOR BIDDING IN ROUNDS

CROSS-REFERENCE TO RELATED APPLICATIONS

The present application is a continuation-in-part of U.S. patent application Ser. No. 09/252,790, filed Feb. 19, 1999, now U.S. Pat. No. 6,230,146 currently pending and assigned to the assignee of the present invention.

BACKGROUND OF THE INVENTION

1. Field of the Invention

The disclosed invention relates generally to conducting multiple auction rounds for one or more lots of goods or services, and in particular, to basing a rule for an auction round on an occurrence in a previous auction round, wherein a condition for defining the rule is defined prior to commencing the previous auction.

2. Description of the Background

Procurement of goods and services have traditionally involved high transaction costs. The cost of finding and qualifying potential bidders has been particularly high. The advent of electronic commerce has introduced new methods of procurement that lower some of the transaction costs associated with procurement. Electronic procurement, in particular business-to-business electronic procurement, matches buyers and suppliers and facilitates transactions that take place on networked processors.

Four models of electronic procurement have been developed: catalog, buyer-bidding auctions, seller-bidding auctions, and exchange marketplaces.

The "catalog" model was an early form of online electronic procurement. Initially, electronic catalogs were developed primarily by sellers, typically suppliers, to help customers obtain information about products, and order supplies electronically. Those first electronic catalogs were single-source; i.e. they only allowed customers to obtain information and products from that supplier.

Although the first electronic catalogs reduced the information search cost associated with procurement, customers were disadvantageously "locked in" to one supplier at each electronic catalog. Customers were thus unable to compare a number of competing products in a single catalog. Therefore, certain suppliers with single-source catalogs began including competitors' products in their systems. The inclusion of competing products in electronic catalogs reduced procurement information search costs even further. By offering competing products, electronic catalogs became "electronic markets."

Many electronic catalogs, however, were biased toward the supplier offering the electronic catalog, and it was thought that procurement costs could be lowered further through an unbiased market. Therefore, third-party "market makers" developed markets for many standard products and services, which were intended to be unbiased markets.

Electronic commerce using the electronic catalog model typically involves one buyer and one seller at a time. When many buyers compete for the right to buy from one seller, a buyer-bidding auction model, or forward auction, is created. Catalog and buyer-bidding auction models, however, have limitations and do not work well in every situation. For example, it is difficult for a supplier to publish set prices in a catalog for custom products. Therefore, when a buyer requires a custom product, pricing for that product typically will not be found in a catalog. Likewise, it is difficult to specify a custom product and identify buyers who might use that custom product for a buyer-bidding auction. Additionally, there may be only one buyer interested in a custom product, such that a buyer-bidding auction may not be applicable in all cases. Thus, few suppliers can typically provide custom goods and services and standard product and pricing information is typically not available for buyers of custom industrial products.

Referring again to the cost of traditional procurement, and particularly procurement of custom products and services, when a company required a custom product, a buyer for the company would typically procure the product by searching for potential suppliers and then acquire price quotes from the potential suppliers for the needed custom product. The search tended to be slow and random, and typically relied heavily on personal relationships. The costs associated with locating vendors, comparing prices, and negotiating a deal were therefore large. The cost of switching suppliers was also large, such that an incumbent supplier's quoted price was most likely not the lowest price he could offer because the incumbent supplier knew the buyer would face switching costs to use another supplier. As an additional consequence, new suppliers had a difficult time entering the market because of those high switching costs.

Therefore, supplier-bidding auctions for products and services defined by a buyer have been developed. The assignee of the present application has developed a system in which sellers downwardly bid against one another to achieve the lowest market price in a supplier-bidding auction. In such auctions, various goods or services may simultaneously be placed for auction. In certain situations, however, there is a need to provide two or more auctions falling chronologically one after another. Each such auction falling in chronological order is referred to herein as an "auction round."

Thus, there is a need for a system, apparatus and process whereby a sponsor may conduct an auction having multiple auction rounds which is referred to herein as "bidding in rounds." Furthermore, when bidding in auction rounds, there is a need to provide a system, apparatus and process whereby an aspect of a subsequent auction round may be based on an occurrence in a previous round.

There is also a need for a system, a method, and an apparatus that allows a purchaser to purchase goods and/or services from more than one supplier. There is a need for a system, a method, and an apparatus that allows a purchaser to purchase a quantity of goods or service that is greater than the quantity that at least one bidding supplier is able to provide. Furthermore, there is a need for a system, a method, and an apparatus that allows a purchaser to view the actions of bidders in an auction, weigh those actions, and determine from those actions which bidders will be invited to participate in a future auction.

SUMMARY OF THE INVENTION

In accordance with one form of the present invention, there is provided a method and system of conducting an auction in at least two rounds. The method includes forming a rule for a second auction round, conducting the first auction round, applying the rule to an occurrence in the first auction round, and conducting a second auction round in accordance with the applied rule. In a preferred embodiment, an outcome of the first auction round, such as, for example, the identity of one or more leading bidders in the first round, the identity of the bidder that was awarded a contract in the first round, or the identity of one or more non-leading bidders in the first round, are used in conjunction with the rule in order to determine the conduct of the second auction round. The method of the present invention can be applied to both reverse and forward auctions. In addition, the method is particularly applicable to online auctions where bidders submit bids to an auction coordinator electronically through an online facility during the auction process.

In a particular embodiment, the method of the present invention is directed to the conducting of an auction in at least two rounds. In this embodiment, a determination is made that a bidder may participate in a subsequent auction round only if the bidder was not awarded a contract in a previous auction round. In accordance with this embodiment, a first auction round is conducted, and a contract is awarded to a bidder in the first auction round. Thereafter, a second auction round that includes only bidders that were not awarded a contract in the first auction round is conducted.

In accordance with another embodiment, the present invention is directed to a method of conducting an auction in at least two rounds, wherein a determination is made that a bidder may participate in a subsequent auction round if that bidder is a leading bidder in a previous auction round. In accordance with this aspect of the invention, a first auction round which includes a plurality of bidders is conducted, and one or more of the plurality of the bidders is designated as non-leading bidder(s) in accordance with the conducting of the first auction round. Thereafter, a second auction round that excludes the non-leading bidders is conducted. In further embodiments, a third auction round which includes only leading bidders from a first or second auction round may be subsequently conducted.

A system for conducting an auction in at least two rounds is also disclosed. The system includes a sponsor processor, a first bidder processor communicating with the sponsor processor, and a second bidder processor communicating with the sponsor processor. The sponsor processor contains instructions which, when executed by the processor, cause the processor to conduct a first auction round, apply a rule to an occurrence in the first auction round, and conduct a second auction round in accordance with the applied rule.

A computer readable medium having instructions stored thereon is also disclosed. The instructions are such that when executed by a processor, the instructions cause the processor to conduct the first auction round, apply a rule to an occurrence in the first auction round, and conduct a second auction in accordance with the applied rule.

In accordance with yet a further embodiment, the present invention is directed to a bidding device operated by a bidder during an online auction. The bidding device could, for example, be a personal computer, workstation, or terminal used by the bidder during the auction. The bidding device includes software that enables the bidder to submit bids to a sponsor processor during a first auction round. The sponsor processor applies a rule to an occurrence in the first auction round. The bidding device is then selectively enabled to allow the bidder to submit bids to the sponsor processor in a second auction round in accordance with the applied rule.

Thus, the present invention provides a method, apparatus and system whereby a sponsor may beneficially conduct an auction having multiple auction rounds. Furthermore, the present invention beneficially provides a method, apparatus and system whereby an aspect of a subsequent auction round may be based on an occurrence in a previous round.

The present invention also provides a system, a method, and an apparatus that allows a purchaser to purchase goods and/or services from more than one supplier. In addition, the present invention provides a system, a method, and an apparatus that allows a purchaser to purchase a quantity of goods or service that is greater than the quantity that at least one bidding supplier is able to provide. Furthermore, the present invention provides a system, a method, and an apparatus that allows a purchaser to view the actions of bidders in an auction, weigh those actions, and determine from those actions which bidders will be invited to participate in a future auction.

Accordingly, the present invention provides solutions to the shortcomings of prior online auctions. Those of ordinary skill in the art will readily appreciate, therefore, that those and other details, features, and advantages will become further apparent in the following detailed description of the preferred embodiments.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention.

In the drawings.

DETAILED DESCRIPTION

Figure 1A:
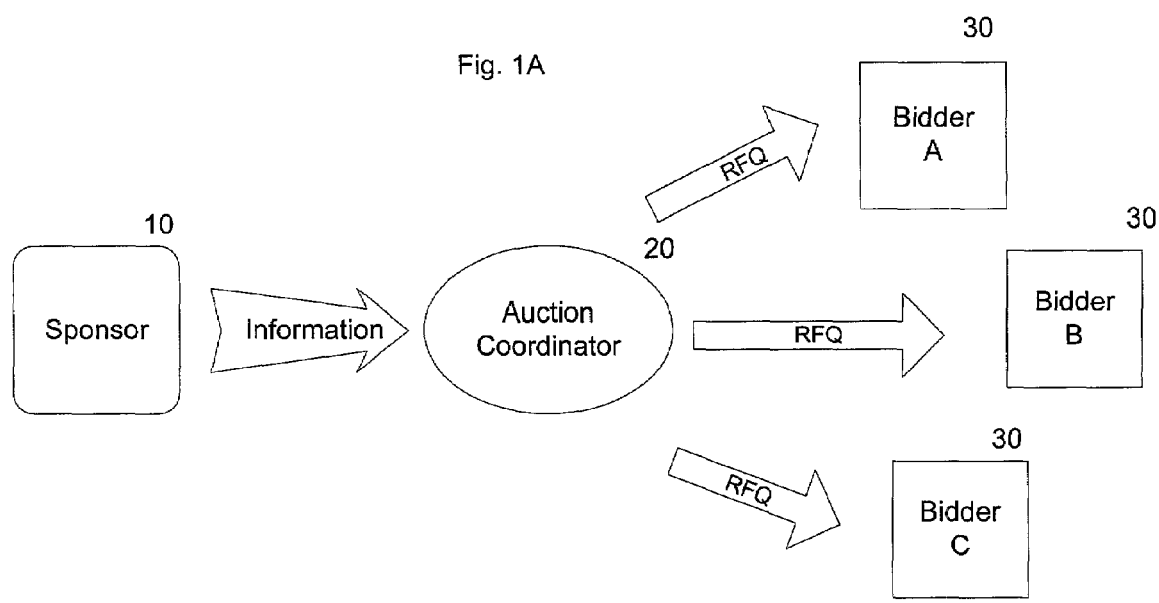
FIG. 1A is a schematic illustration of the entities involved in an embodiment of an auction wherein the sponsor identifies goods or services to be purchased in a request for quotation.

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical auction systems and computer networks. The present invention described below extends the operation of the inventive auction systems and methods described in greater detail in co-pending U.S. patent application Ser. No. 09/252,790, entitled "Method and System for Conducting Electronic Auctions" filed Feb. 19, 1999, and U.S. patent application Ser. No. 09/490,877, entitled "Method and System for Partial Quantity Evaluated Rank Bidding in Online Auctions" filed Jan. 24, 2000, the disclosures of which are hereby expressly incorporated in the present application.

In a supplier-bidding auction or reverse auction, bids, which are often in the form of a price quote, typically start high and move downward over time as bidders interact to establish a closing price. Typically, the auction marketplace is one-sided, with one buyer and many potential suppliers, although multiple-buyer auctions are possible. Typically, products are purchased in the form of components or materials. "Components" may include fabricated tangible pieces or parts that become parts of assemblies of durable products. Example components include gears, bearings, and appliance shelves. "Materials" may include bulk quantities of raw materials that are further transformed into products. Example materials include corn syrup and sheet steel. Services may also be purchased in such a reverse auction.

Industrial buyers do not typically purchase one component at a time. Rather, they tend to purchase whole families of similar components. Therefore, in a typical industrial supplier-bidding auction, products are grouped together in "lots" of related items for bidding. In a regular lot bidding auction, each lot is composed of several "line items." In the regular lot bidding auction, the suppliers bid on each line item and the bidder 30 having the best bid for all of the parts in the lot is the best bidder 30. The best bidder 30 is typically awarded a contract to supply the items in the lot. In an aggregate type lot bid, a single bid for all of the line items is submitted by each bidder 30 and the bidder 30 submitting the lowest aggregate price is the best bidder 30. By lotting products, potential suppliers can bid on lots for which they are best suited, and are not typically required to bid on every lot. Such a division into lots beneficially reduces the barrier to entry for new potential suppliers that only have capability to supply some of the needed products in the auction. Reducing the barrier to entry also benefits the purchaser by injecting additional bidders 30 into bidding for certain lots.

Typically, components in a lot are related to one another such that it is more efficient to have a supplier provide all of the components in that lot. As an example, a buyer might purchase a given plastic knob in two different colors, or might purchase a nameplate in four different languages. Those parts are so similar that it is nearly always more efficient to purchase those related components from the same supplier because, for example, all of the knobs may be made using with same mold. Thus, such related items are typically grouped in a single "lot." As is known by one skilled in the art, there are many additional methods of lotting products for an auction.

Figure 1B:
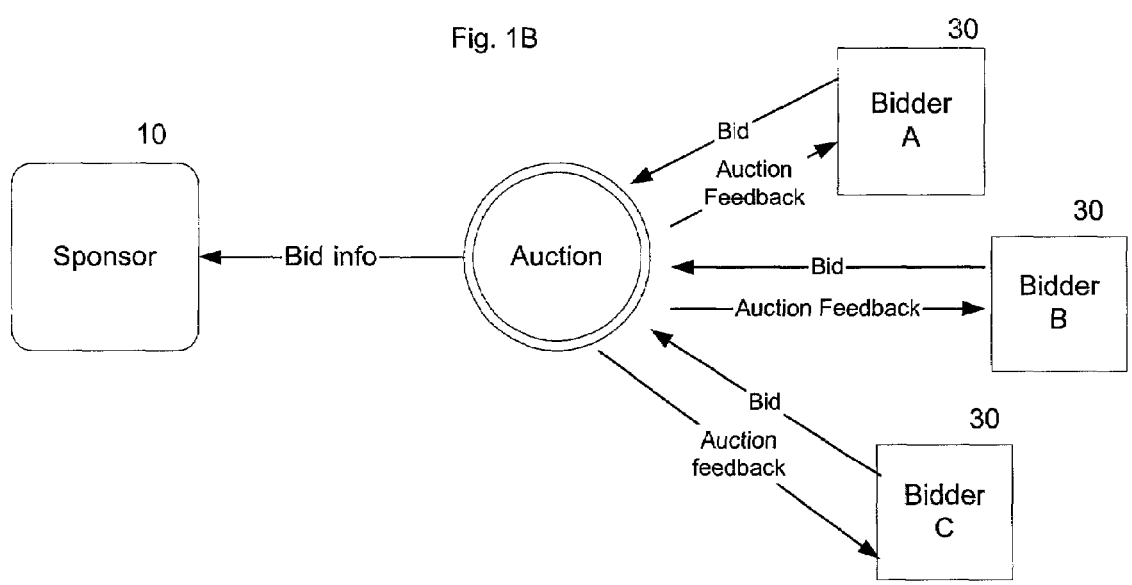
FIG. 1B is a schematic illustration of entities participating in an embodiment of an auction.
Figure 1C:
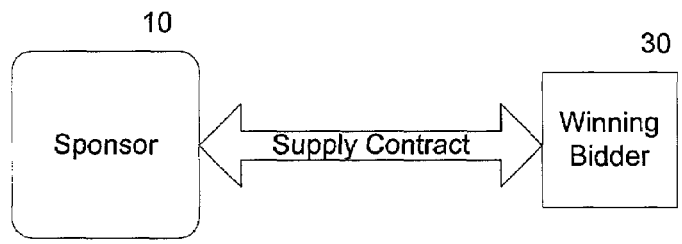
FIG. 1C is a schematic illustration of entities participating in an embodiment of a contract award following an auction.

The basic process for a purchaser sponsored supplier-bidding or reverse auction, as conducted by the assignee of the present invention, is described below with reference to FIG. 1. FIG. 1 illustrates the functional elements and entities involved in setting up and conducting a typical supplier-bidding auction. FIG. 1A illustrates the creation of an auctioning event, FIG. 1B illustrates the bidding during an auction, and FIG. 1C illustrates results after completion of a successful auction.

As will be apparent to one skilled in the art, while the invention is generally described in terms of one buyer and multiple suppliers, the present invention may also be used in other types of electronic markets, such as auctions having multiple potential buyers and sellers, forward auctions having a single seller and multiple potential purchasers, upward-bidding auctions, or electronic exchange marketplaces. The term "sponsor" will be utilized herein to identify the party or parties that originate the auction. In a forward auction, for example, the sponsor would typically be the supplier or seller of one or more goods or services. In such a forward auction, that sponsor might state a good that it desires to sell and receive bids from parties wishing to purchase that good. Those parties wishing to purchase that good would furthermore be "bidders" 30 in such a forward auction.

In a reverse auction example, the sponsor would typically be the purchaser or buyer of one or more goods or services. In such a reverse auction, that supplier might state a good that it desires to purchase and receive bids from parties wishing to supply that good. Those parties wishing to supply that good would furthermore be "bidders" 30 in such a reverse auction.

In the typical supplier-bidding reverse auction model, the product or service to be purchased is usually defined by the sponsor of the auction. As shown in FIG. 1A, when the sponsor 10 decides to use the auctioning system of the present invention to procure products or services, the sponsor 10 provides information to an auction coordinator 20. That information may include information about incumbent suppliers and historic prices paid for the products or services to be auctioned, for example. Typically, the sponsor 10 may also work with the auction coordinator 20 to define the products and services to be purchased in the auction and, if desired, lot the products and services appropriately so that needed products and services can be procured using optimal auction dynamics. A specification may then be prepared for each desired product or service, and a Request for Quotation ("RFQ") generated for the auction.

Next, the auction coordinator 20 typically identifies potential suppliers 30, preferably with input from the sponsor 10, and invites the potential suppliers 30 to participate in the upcoming auction. The suppliers 30 that are selected to participate in the auction become bidders 30 and may be given access to the RFQ, typically through an RFQ in a tangible form, such as on paper or in an electronic format.

As shown in FIG. 1B, during a typical auction, bids are made for lots. Bidders 30 may submit actual unit prices for all line items within a lot, however, the competition in an auction is typically based on the aggregate value bid for all line items within a lot. The aggregate value bid for a lot may, therefore, depend on the level and mix of line item bids and the quantity of goods or services that are offered for each line item. Thus, bidders 30 submitting bids at the line item level may actually be competing on the lot level. During the auction, the sponsor 10 can typically monitor the bidding as it occurs. Bidders 30 may also be given market feedback during the auction so that they may bid competitively.

Feedback, including bidder 30 identity, about bidding activity is referred to as "market feedback" and includes any information or data related to the bidders 30 or their bids, interrelationships between those bids, and any other bid related information or data that is received before or during the auction. Market feedback may include, for example, bids that have been placed by other bidders 30, the rank of a participants bid in relation to one or more other bidders 30, the identity of bidders 30, or any subset of that information. Market feedback may also include non-pricing information such as, for example, the quality of the goods to be provided by bidders 30 and shipping costs associated with one or more bidders 30. Providing such market feedback to bidders 30 in an auction helps create real-time competitive interaction among participants in the auction because, without feedback, bidders 30 who are not leading in an auction might not be aware or their relative position and would have less incentive to revise their price quotes and place additional bids to remain competitive.

After the auction, the auction coordinator 20 may analyze the auction results with the sponsor 10. The sponsor 10 typically conducts final qualification of the low bidding supplier or suppliers 30. The sponsor 10 may furthermore retain the right not to award business to a low bidding supplier 30 based on final qualification or other business concerns. As shown in FIG. 1C, at least one supply contract is usually drawn up and executed based on the results of the auction.

The auction may be conducted electronically between bidders 30 at their respective remote sites and the auction coordinator 20 at its site. In an alternative embodiment, instead of the auction coordinator 20 managing the auction at its site, the sponsor 10 may perform auction coordinator tasks at its site.

Figure 2:
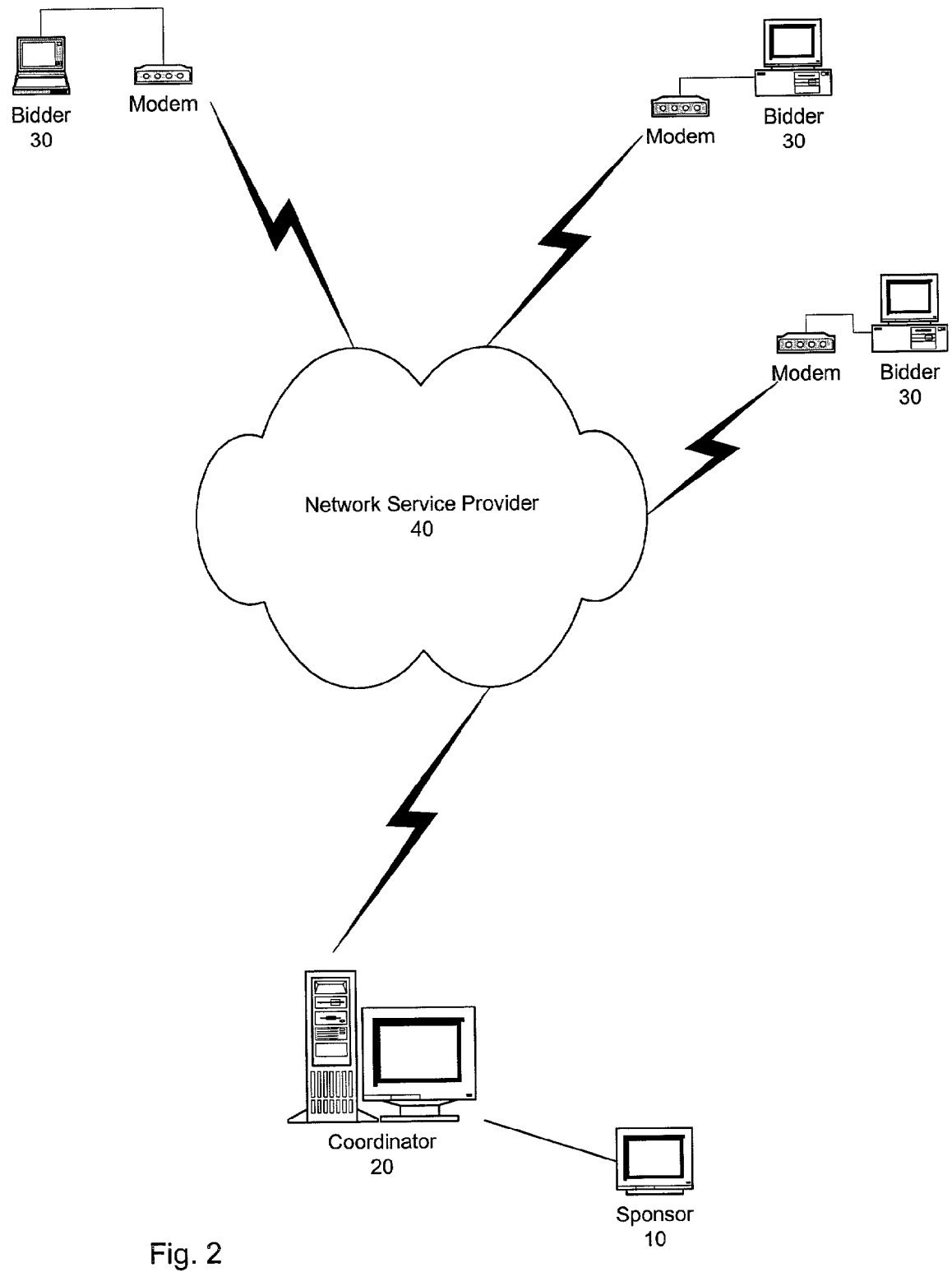
FIG. 2 is a schematic illustration of communications links between the coordinator, the buyer, and the suppliers in an embodiment of an auction.

Information may be conveyed between the coordinator 20 and the bidders 30 via any known communications medium. As shown in FIG. 2, bidders 30 may be connected to the auction through the Internet via a network service provider 40 accessed, for example, through a dial-up telephone connection. Alternately, sponsors 10 and bidders 30 may be coupled to the auction by communicating directly with the coordinator 20 through a public switched telephone network, a wireless network, or any other known connection method. Other methods of connecting sponsors 10 and bidder 30 and other communications mediums are known to those skilled in the art, and are intended to be included within the scope of the present invention.

Figure 3:
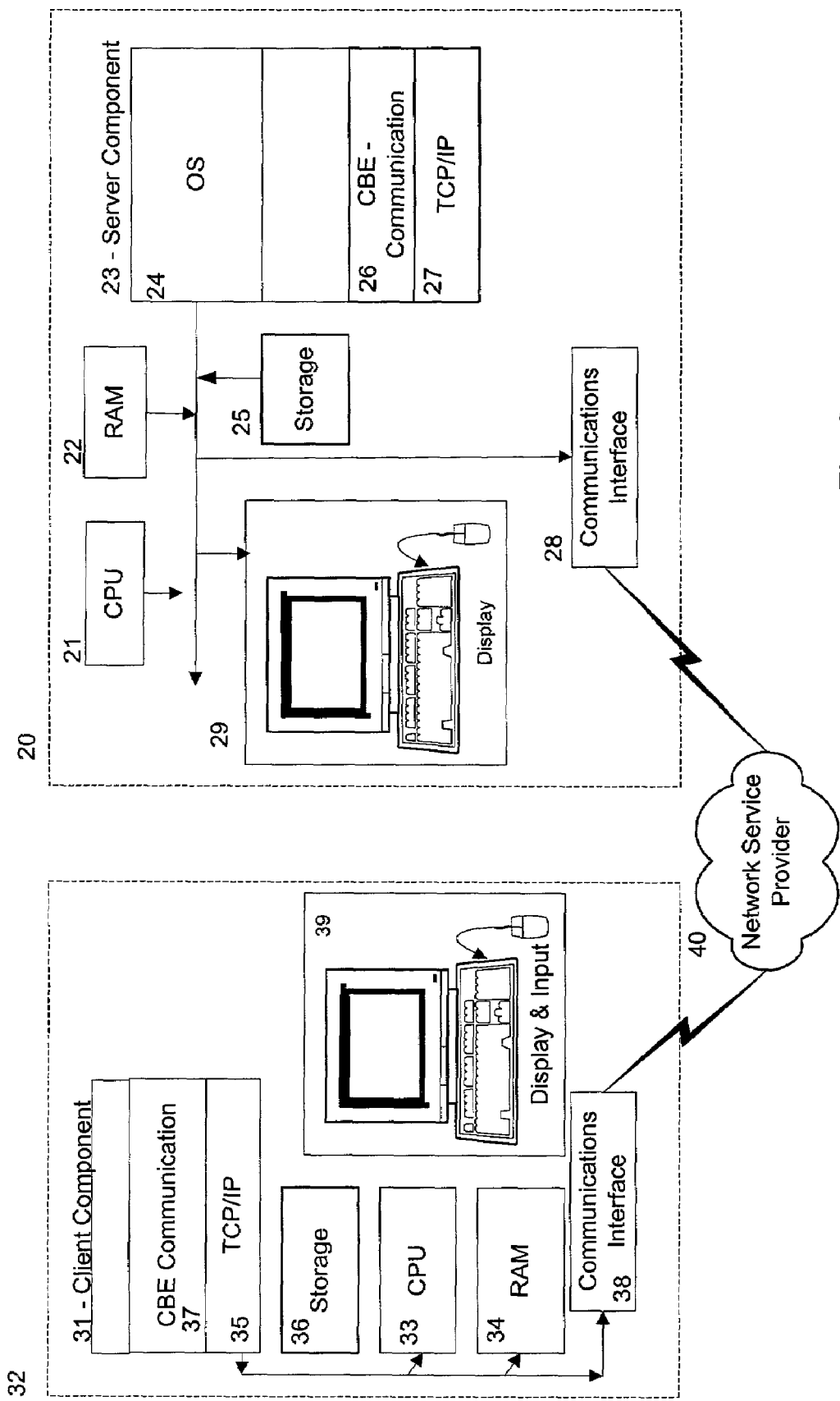
FIG. 3 is a schematic illustration of auction software and computers hosting that software in an embodiment of an auction.

A computer software application may be used to manage the auction. The software application may include two components: a client component 31 and a server component 23. FIG. 3 illustrates a server component 23 and a client component 31 resident in host computers in a first embodiment. As may be seen in FIG. 3, the server component of that embodiment includes an operating system 24, competitive bidding event or auction communication software 26, and Internet protocol software 27. The server software is hosted on a computer 20 having a processor 21, random access memory 22, and a data storage facility 23. The host computer 20 also includes input and output devices 29 such as, for example a monitor, printer, mouse and keyboard, and a communications interface 28 for communicating with the client component 31. The client component of the embodiment illustrated in FIG. 3, includes competitive bidding event communication software 37, and Internet protocol software 35. The client component software is hosted on a computer 32 having a processor 33, random access memory 34, and a data storage facility 36. The host computer 32 also includes input and output devices 39 such as, for example a monitor, printer, mouse and keyboard, and a communications interface 38 for communicating with the server component 23.

The client component 31 is used by the bidders 30 to make bids during the auction, and to receive and display feedback from the auction. The client component may, for example, be a program that is installed on a bidder's computer, or it may be software that is accessed and run from a Website. Bids can typically only be submitted using the client component of the application, thereby ensuring that sponsors 10 cannot circumvent the bidding process, and that only invited suppliers 30 participate in the bidding. Each computer software application may be stored in a data storage device and executed by a processor such as those described in connection with FIG. 4 hereinbelow.

Bids are sent over the communications medium to, for example, the auction coordinator, or where the sponsor 10 is performing auction coordination tasks, directly to the sponsor 10. Bids are received by the server component 23. The client component includes software functions for making a connection over the Internet, or other medium, to the server component. Bids are submitted over this connection and feedback is sent to connected bidders 30.

When a bidder 30 submits a bid, that bid is sent to the server component and evaluated to determine whether it is a valid or acceptable bid. Feedback about received bids is sent to connected bidders 30 as is applicable, enabling bidders 30 receiving feedback to see changes in market conditions and plan competitive responses.

The embodiments described herein utilize an online reverse auction, wherein the present invention is performed by a computer processor, as an example in which the present invention may be utilized. In those examples, suppliers 30 bid to supply goods or services to a purchaser 10 and the purchaser 10 typically purchases the goods or services from the lowest priced qualified bidder 30. It is to be understood, however, that the present invention may be used in other applications, would not necessarily have to occur online, and may be performed by other than a computer processor. The present invention may also be utilized in connection with auctions other than reverse auctions. For example, the present invention may be advantageously utilized with forward auctions, wherein the party offering the highest priced qualified bid, rather than the lowest priced qualified bid, is awarded the goods or services being sold. In the case of a forward auction, the "leading bid" is the highest amount offered and the leading bidder 30 is the purchaser party 10 making that highest offer, while in a reverse auction, the "leading bid" is the lowest amount offered and the leading bidder 30 is the supplier party 30 making that lowest bid. Similarly, placing a "better bid" in a reverse auction indicates placing a lower bid, while placing a "better bid" in a forward auction indicates placing a higher bid.

Figure 4:
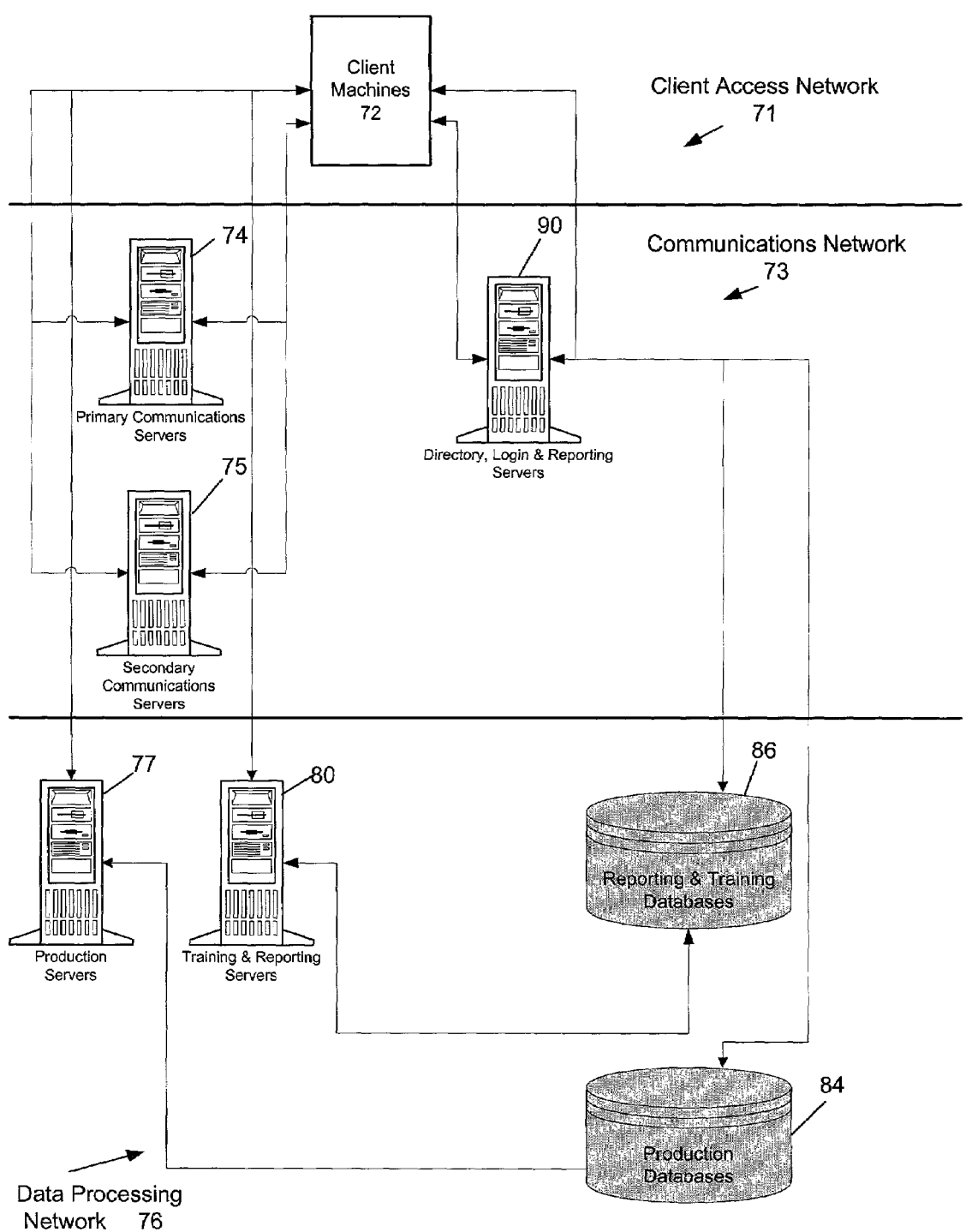
FIG. 4 is a schematic illustration of an embodiment of an auction network.

FIG. 4 is a diagram illustrating an auction network 70 of the present invention for operating an auction, and into which the server component 23 and client component 31 may be incorporated. The auction network 70 may be divided into three functional sections: a client access network 71, a communications network 73, and a data processing network 76. The client access network 71 may, for example, include one or more client machines 72 for accessing and communicating with the communications network 73. The communications network 73 may include one or more primary communications servers 74, secondary communications servers 75, and directory, login and reporting servers 90. The data processing network 76 may include production servers 77, training and reporting servers 80, reporting and training databases 86, and production databases 84. The production servers 77 and training and reporting servers 80 are referred to collectively herein as bid servers 77 and 80.

The client machines 72 may be, for example, personal computers and may be located at each bidder 30 and purchaser site 10 for accessing the auction. The client machines 72 may access the auction by, for example, connecting to a web site operated by the party hosting the auction. The client machines 72 may also receive software from the communications network 73 that facilitates communications with the communications network 73. Each client machine 72 may have a processor that executes applicable software, and a data storage device that stores applicable software and other auction data.

The primary communications servers 74 are utilized to provide information to bids 58 received from the client machines 72 to the bid servers 77 and 80, and to provide that bid information from the bid servers 77 and 80 to the client machines 72. The primary communications servers 74 may furthermore act as a firewall to prevent direct access to the bid servers 77 and 80 by the client machines. The secondary communications servers 75 act as backups to the primary communications servers 74. The secondary communications servers 75 will perform the communication functions normally performed by the primary communications servers 74 if a failure occurs in the primary communications servers 74, thereby providing redundancy to the auction network 70.

The directory, login, and reporting servers 90 may perform a variety of functions that may be performed by a single server or include separate servers for the various functions. The directory, login, and reporting servers 90 may include a web server that acts as a portal for access to the auction network 70. As such, the directory, login, and reporting servers 90 will receive login requests for access to the auction network 70 via, for example, the Internet. The directory, login, and reporting servers 90 may make access decisions as to whether a client machine 72 is permitted to access the communications network 73. If access is permitted, the directory, login, and reporting servers 90 will direct the client machine 72 to the appropriate portion of the auction network 70. The directory, login, and reporting servers 90, may provide reports to client machines 72. For example, information from prior auctions which may be utilized by purchasers 10 to make a decision as to which bidder 30 will be awarded the sale and to permit the purchaser 10 to consider the way in which the auction proceeded so that future auctions may be refined.

Figure 5:
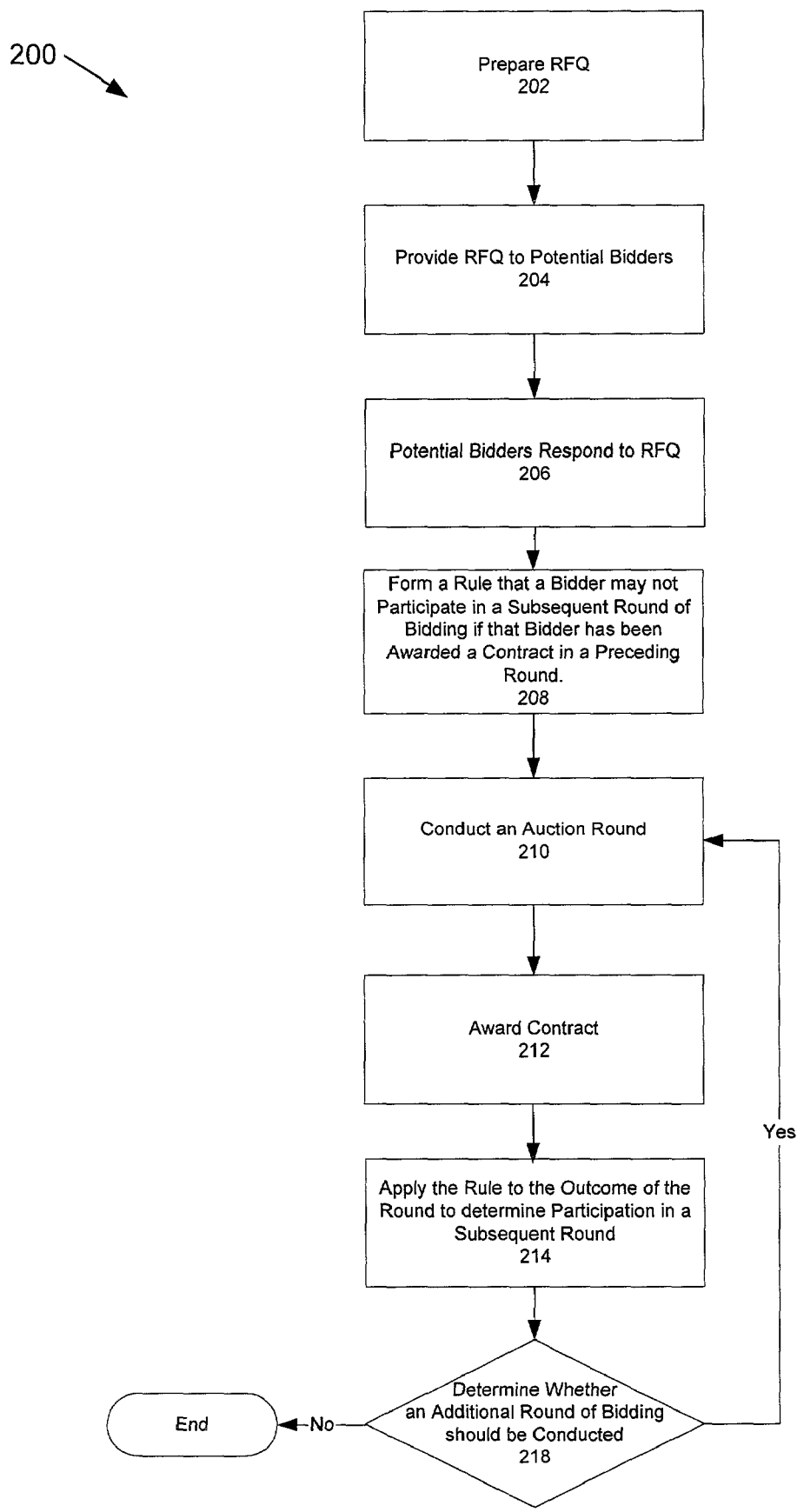
FIG. 5 is a flow diagram illustrating an embodiment of an auction that occurs in rounds, in accordance with the present invention.
Figure 6:
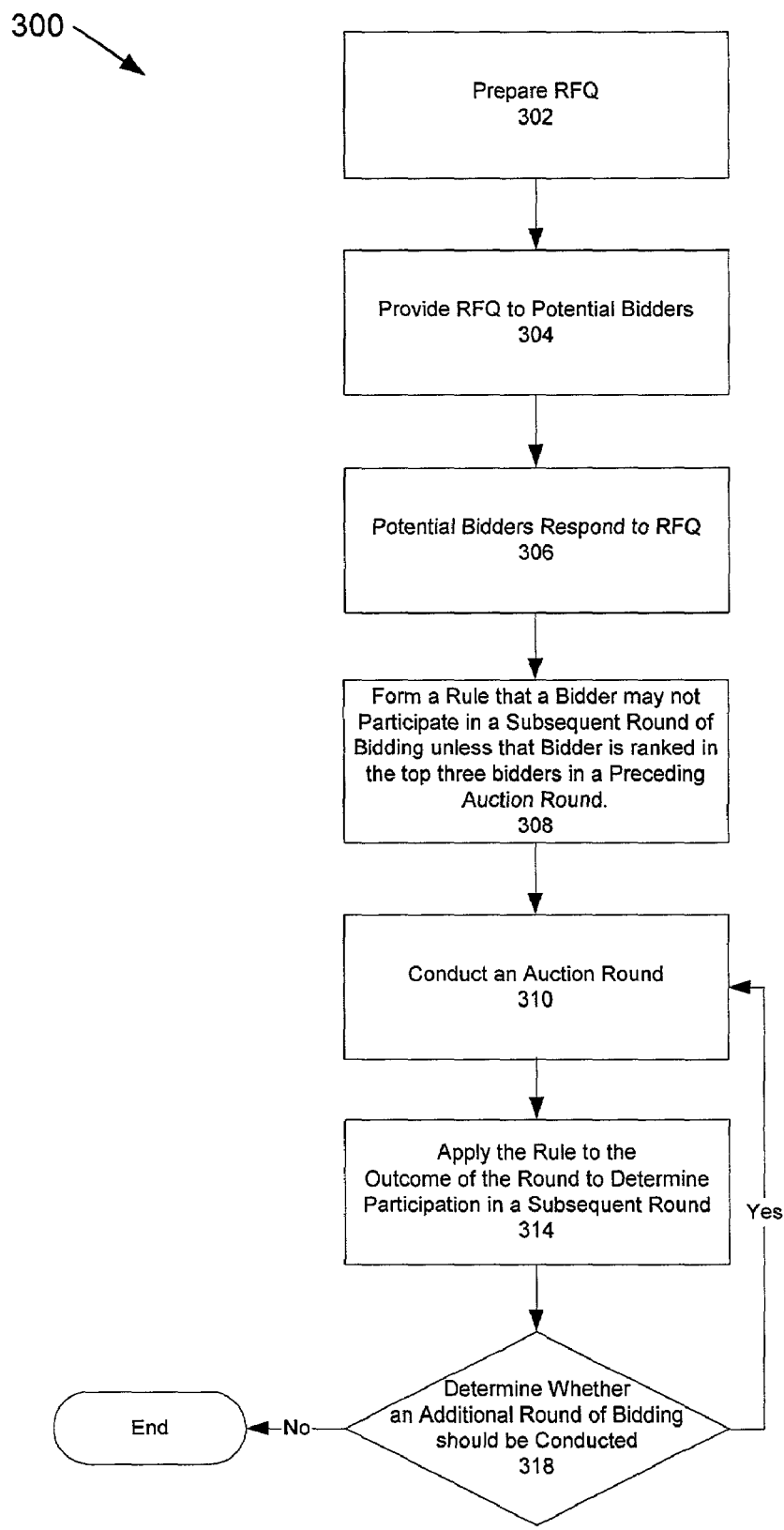
FIG. 6 is a flow diagram illustrating another embodiment of an auction that occurs in rounds, in accordance with the present invention.

The production servers 77 run the bidding software that facilitates the auction process such as, for example, the software illustrated in FIGS. 5 and 6. The production servers 77 may communicate with client machines 72 through primary and secondary communications servers 74 and 75. The production servers 77 may also be redundant so that if a failure occurs in the production server 77 that is being utilized in an auction event, the redundant backup production server 77 may perform the functions of the failed production server 77 and, thus, prevent failure of the auction.

The training and reporting servers 80 operate in a manner similar to the production servers 77 and provide reports for auctions. It is useful to operate test auctions to test the operating systems and to train personnel and clients. Such testing may be performed on the production servers 77 or, to prevent any degradation of system operation in actual auctions, one or more separate training servers may be utilized for testing and training. Reporting may also be accomplished on the production servers 77 or the report creation functions may be off-loaded to one or more reporting servers 80. The reporting servers 80 may furthermore be combined with the training servers 80.

Each server 74, 75, 77, 80, and 90 may have a processor that executes applicable software, and a data storage device that stores applicable software and data. It should be noted that, although the present invention is described in terms of a server component and a client component, one skilled in the art will understand that the present invention is not limited to a client/server program relationship model, and may be implemented in a peer-to-peer communications model or any other model known to those skilled in the art.

Data related to auctions may furthermore be held in one or more storage devices. The data storage devices may, for example, be a magnetic storage device, a random access memory device (RAM), or a read only memory device (ROM). The data may include pre-auction data, post auction data, and data that is related to active auctions. Pre-auction data may include, for example, suppliers 30 that are permitted to bid on a particular auction and the scheduled auction starting and ending times. Post auction data may include the bids and bid times received in a particular auction and reports displaying that data in user friendly formats. Active auction data may include data received from the bidders 30 as the auction is taking place and related data such as the rank of each bidder 30.

The "rank" of the bidders 30 is generally determined by comparing the lowest amount bid by each bidder 30 and ordering the bidders 30 according to those lowest bids. The bidder 30 ranked first is the bidder 30 that has bid an amount lower than any other bidder 30 in a reverse auction. The last rank may be a rank equal to the number of bidders 30 who have submitted bids in the auction, and the bidder 30 having that last rank is the bidder 30 that has submitted the highest amount in a reverse auction that is based on price only. Of course, there are many known ways to calculate rank, and any of those may be used in connection with the subject invention. The other bidders 30 are generally ranked between first and last according to the amounts of their lowest submitted bids. Thus, a higher, or better ranked bidder 30 in a reverse auction is a bidder 30 who has placed a comparatively lower bid, while a higher, or better ranked bidder 30 in a forward auction is a bidder 30 who has placed a comparatively higher bid. An auction may alternately be based on one or more factors other than price, such as quality, delivery factors, and/or other factors that are referred to herein collectively as "total value." Thus, rank may also be based on factors other than price, including total value and any other factor that is useful in an auction setting. A bid or bid amount is a value that is submitted by each participating bidder 30 for comparison to the bids of other bidders 30, and may likewise be based on a variety of bid factors that are considered important to the bid participants. Those factors may include, for example, price, quality, other costs such as delivery costs, or a total value. Bids may also be placed in a number of ways including, for example, absolute total value, or comparative value such as bidding in relation to an index price.

Three databases, or groupings of databases, are incorporated into the auction network illustrated in FIG. 4. The production databases 84 hold data that will be used by or is received from the production servers 77, while the reporting and training databases 86 hold data that will be used by or is received from the training and reporting servers 80.

The directory, login, and reporting servers 90 illustrated provide a web portal for the client machines 72. The directory, login, and reporting servers 90 provide an initial contact point for the client machines 72, access to auctions in which the client machine 72 is permitted to participate, and reports relating to active and closed auctions.

One skilled in the art will recognize that certain components of the network described herein, while beneficial to an auction network, are not necessary components in an operational auction network. For example, the secondary communications servers 75 could be removed where the benefit of redundancy is not desired, and the primary communications servers 74 could be removed and the client machines 72 could communicate directly with the bid servers 77 and 80.

The present invention permits a sponsor 10 conducting more than one auction to base the conduct of a subsequent auction on one or more occurrences in a previous auction. In one embodiment, the present invention includes a method of conducting an auction in at least two rounds. In that embodiment, a subsequent round of auction is conducted in accordance with a rule, that is defined prior to a preceding round of auction and is based on one or more occurrences in the preceding auction round. During or after the preceding round of auction, the occurrences are considered in light of the rule, and a subsequent auction round is then conducted utilizing the rule. The present invention may, for example, be executed on the auction network 70, or may be operated manually or in connection with other known mechanisms.

Each auction round may be viewed as a separate auction wherein identified goods or services are placed for auction, bidders 30 place bids to purchase or sell the identified goods or services, a predefined period elapses after which the auction terminates and, typically, a contract is awarded for the sale of the identified goods or services. Furthermore, a contract is typically awarded to the lowest bidding supplier or the highest bidding purchaser, depending on whether suppliers or purchasers are bidding in the auction.

A sponsor 10 may wish to conduct an auction in several rounds for a variety of reasons including, for example, the need to purchase more goods than may be supplied by the bidders 30 or a desire to learn from an early auction round and make alterations in subsequent rounds. In certain circumstances, it is beneficial to award contracts to multiple bidders 30 in multiple rounds rather than awarding contracts to the lowest bidders 30 in a single auction round because market or bidding dynamics will cause total bid prices to be lower when bidding in multiple rounds. For example, where multiple contracts will, or are likely, to be awarded from a single auction, a bidder 30 may place bids that maintain that bidder 30 in second or higher rank, knowing that it will be awarded a contract at a higher price in spite of not being the lowest bidder. Bidding in rounds may beneficially diminish the practice of bidding for second or higher rank, because only the first ranked or lowest bidder is awarded a contract in each round.

FIG. 5 is a flow diagram 200 illustrating an embodiment of the present invention wherein a purchasing sponsor 10 desires to purchase a large quantity of goods, and wherein a second auction round will include qualified bidders 30 from a first auction round. At 202, the sponsor 10 will typically prepare a request for quote ("RFQ") describing the goods to be purchased. At 204, that RFQ is provided to potential bidders 30. Each potential bidder 30 that desires to participate in the auction may then respond to the RFQ at 206. The potential bidder 30 will typically respond by indicating the desired goods that bidder 30 is willing to provide, the quantity and quality of the goods that the bidder 30 can provide, and conditions under which the bidder 30 can provide those goods in those quantities and qualities. Those conditions may include the time period during which the identified goods may be provided. In a certain circumstance, none of the potential bidders 30 may be able to provide the desired quantity of goods in the desired time period. In another circumstance certain bidders 30 may be able to provide the entire desired quantity of goods, while other bidders 30 cannot provide the entire quantity desired. In the latter circumstance, the sponsor 10 may wish to permit those potential suppliers 30 that cannot provide the entire quantity of goods to participate in one or more rounds of the auction, for example, to assure that a minimum number of bidders 30 participate in the auction, or because they are preferred suppliers 30.

The sponsor 10 may wish to contract for all of desired goods or services at one time despite of the inability of all bidders 30 to provide all desired goods or services. Thus, the sponsor 10 may choose to award contracts to multiple low bidders 30 or may conduct multiple rounds of bidding and award contracts to the lowest bidder 30 in each round until the total quantity of goods desired has been purchased. If the sponsor 10 desires to conduct bidding in rounds, at 208, the sponsor 10 may formulate a rule conditioning the inclusion of a bidder 30 in a subsequent auction round on that bidder 30 having not been awarded a contract in a preceding round. That rule may or may not be expressed to potential bidders 30 before the opening of, or during, a given auction round. Thus at 210, the sponsor 10 may conduct a first round auction, the outcome of which is an award of a contract to the lowest bidder 30 at 212. The sponsor 10 will then apply the rule that awarded bidders 30 may not participate in subsequent rounds to an appropriate occurrence in the first round of the auction at 214. In the present example, the rule is applied to the outcome and, more specifically, to the awarded bidder 30, to determine participation in the second auction round. Thus, in the example of FIG. 5, the bidder 30 that is awarded a contract in the first auction round may not participate in the second auction round. At 218, the sponsor 10 will determine whether additional goods or services should to be purchased at that time, and if an additional purchase is to be made, an additional auction round will be conducted. The sponsor 10 will repeat the process of conducting an auction round at 210, awarding a contract at 212, applying the rule to the outcome at 214, and determining whether another auction round should be conducted at 218. Thus, the contract that is awarded each round may, for example, cover a portion of the entire quantity of goods or services desired to be purchased in the auction.

When more than two rounds of bidding are contemplated, under the circumstances described in connection with FIG. 5, the sponsor 10 may condition participation in subsequent rounds on having not received an award in any preceding round. Thus, the sponsor 10 may subtract the amount of goods purchased thus far in the auction from the amount of goods needed to determine whether additional goods need to be purchased at 218. If additional goods need to be purchased, the sponsor 10 will typically return to 210 and conduct an additional auction round that does not include successful bidders 30 from previous rounds. The sponsor 10 will then repeat the process of conducting an auction round at 210, awarding a contract at 212, applying the rule to the outcome at 214, and determining whether another auction round should be conducted at 218, until no further auction rounds are necessary.

FIG. 6 illustrates an embodiment of the present invention, wherein a purchasing sponsor 10 has little experience with electronic auctions, at least in connection with goods to be purchased at that time, and wherein the sponsor 10 will conduct a second auction round including qualified bidders 30 from a first auction round. Such a sponsor 10 may wish to learn from an early auction round and make alterations in subsequent rounds. As in the example illustrated previously in FIG. 5, the sponsor 10 prepares an RFQ at 302 and provides that RFQ to potential bidders 30 at 304. At 306, the potential bidders 30 respond to the RFQ. In the specific embodiment illustrated in FIG. 6, the sponsor 10 is interested in determining which bidders 30 will actively participate in an initial auction round. Therefore, the sponsor 10 will initiate a first auction round for purchasing a portion of the total goods to be purchased in the auction. Prior to conducting the first auction round, however, the sponsor 10 will create a rule at 308 for including a bidder 30 in a subsequent auction round that is based on an occurrence in the first auction round. That rule may or may not be expressed to the potential bidders 30. The rule utilized in the example depicted in FIG. 6 limits inclusion in subsequent auction rounds to bidders 30 ranking in the top three bidders 30 in the first auction round. Thus, only the top three bidders 30 in the first auction round will be permitted to participate in subsequent auction rounds. Reasons for limiting the number of bidders 30 include, but are not limited to, a desire to minimize the number of entities that may view the auction to protect privacy, to remove bidders 30 who are unlikely to be competitive, and to narrow the field for interactive bidding in order to reduce the number of bidders to only those that will be active and save on computer and human resources that support the auction. Other rules that may be utilized include, but are not limited to, permitting only those bidders 30 that place a minimum number of bids to participate subsequently, allowing only those bidders 30 whose best bids fall within a certain number or percentage of dollars or other units of the leading bid to participate in subsequent auction rounds, and/or allowing only non-leading bidders (i.e., bidders that did not win an award in a previous round) to participate in a subsequent round. Other factors, such as quality, could also be utilized in formulating the rules. In an auction where geographic location is important, the bidders that are permitted to participate in a subsequent round may, for example, be those that are both competitive in pricing and are located close to the sponsor. A rule could thus be established that creates a ranking that includes both bid price and distance. When factored together, a different list of bidders might be formed than if price alone were used.

After the rule has been formulated, an auction round will be conducted at 310. At 314, the rule is applied to the appropriate occurrence or occurrences of the first auction round to select, in the example provided in FIG. 6, the three lead bidders 30 for participation in the next auction round. At 318, a determination is made as to whether another auction round is to be conducted. If another auction round is to be conducted, the sponsor 10 will repeat the process of conducting an auction round at 310, applying the rule to the outcome at 314, and determining whether another auction round should be conducted at 318, until no further auction rounds are necessary. It is noted that a rule formulated in, for example, a first round auction, may be applied to one or more subsequent auction rounds. Furthermore, additional rules may be developed in rounds subsequent to the first round. Thus a single rule, formulated during or after the first auction, may, for example, be the only rule applied to subsequent auction rounds. Alternately, one or more rules formulated in preceding rounds may be applied in varying combinations to subsequent auction rounds. Also, in multiple round auctions, no rule may be applied to certain rounds.

Various forms of auctions may also be utilized in different rounds in the present invention. For example, a purchasing sponsor 10 may conduct a sealed bid type first round auction, wherein each bidder 30 submits a single bid to the sponsor 10 in, for example, a sealed envelope, or through an electronic sealed bid collection mechanism. The sponsor 10 may then view all of the bids at a prearranged time. The sponsor 10 may select a winning bidder 30, usually on the basis of the lowest bid submitted, at that time, or the sponsor may use the sealed bids solely to make a decision as to how the second round auction will be conducted. The second round auction could then be, for example, an electronic auction in which only bidders 30 qualifying in the first round auction are permitted to participate. For example, in a certain auction a first round sealed bid is used to determine which bidders 30 qualify to participate in a second round auction to follow.

In another example, a large base of suppliers, which may be, for example, two hundred suppliers, would create a cumbersome electronic auction if all two hundred suppliers participated in that auction. Thus, it may be beneficial to have a simplified round of bidding following which only the best ranked bidders are allowed to move on to an interactive auction. In this example the two hundred bidders may submit bids in an offline auction round. The top bidders may then be allowed to participate in a second, online auction round. Thus, for example, the top ten percent, or twenty bidders in the example provided, in the first round auction may be permitted to participate in the second online auction round.

In another embodiment, wherein similar or identical goods or services are purchased in both the first and second rounds, the first round price is utilized as an initial and/or ceiling bid for each bidder 30 in the second round. Where the sealed bid is utilized as an initial and a ceiling bid, the sealed bid price submitted by each bidder 30 qualifying to participate in the second round auction is entered as an initial bid for that bidder 30 at the beginning of the second round auction and bidders 30 are not permitted to place bids greater than that initial ceiling bid throughout the second round auction. Of course, the initial ceiling bid may also be utilized in additional rounds subsequent to the second round. Furthermore, as may be seen in the previous example, multiple rules may be formulated from one or more auction rounds and those rules may determine which bidders 30 qualify to participate in future rounds, bidder 30 initial bid pricing, and/or ceiling bid level for each bidder 30. As will be recognized by one skilled in the art, any of a variety of decisions that may be based on prior bidding history may also be considered when determining rules and conditions for subsequent auction rounds. For example, the quantity of goods to be auctioned in a round may be determined by pricing levels achieved for various quantities in previous rounds or quantities offered by bidders in previous rounds.

In certain circumstances, a purchasing sponsor 10 may desire to purchase goods from two or more suppliers 30. In such a situation, a single supplier 30 may be able to provide the entire quantity of goods desired. Multiple bidders 30, furthermore, typically do not place equal low bids. Thus, there may be a financial benefit to the sponsor 10 to purchase all goods from the lowest bidding supplier 30. The sponsor 10 may, however, desire to purchase goods from multiple bidders 30, for example, to assure a steady supply of goods where the sponsor 10 envisions a likelihood that one supplier 30 may, for example, have production problems that interrupt delivery of a critical component. The sponsor 10 may, therefore, wish to award contracts to multiple low bidders 30 or may conduct multiple rounds of bidding and award contracts to the lowest bidder 30 in each round until the total quantity of goods desired has been purchased.

An embodiment of the present invention, wherein the sponsor 10 wishes to purchase a good from two suppliers 30 in two auction rounds to assure a steady supply of that critical good, is described with reference to FIG. 5. In that embodiment, that critical good is a necessary component for operation of many products manufactured by the sponsor 10. Furthermore, the sponsor 10 has previously experienced shortages of the critical good because a single supplier 30 had encountered production problems. Thus, the sponsor 10 wishes to purchase between 50% and 70% of the expected supply of the critical good that the sponsor 10 will need over the next year from a single bidder 30 in a first round auction. The sponsor 10 wishes furthermore to purchase the remainder of the critical good that it will need over the next year from a different single bidder in a second round auction.

The critical good embodiment will be further described with reference to FIG. 5, and the critical good will be assumed to be an integrated circuit. Thus, at 202 of FIG. 5, the sponsor 10 prepares an RFQ stating its integrated circuit requirements including the quantity of integrated circuits that are projected to be needed over the next year, and a requirement that any participating bidder 30 must be able to provide at least 50% of the total quantity needed over the next year. The sponsor 10 also provides an optional statement in the RFQ informing the bidders 30 that the auction will be conducted in two rounds and only 50% to 70% of the total integrated circuit requirement will be purchased from the successful bidder 30 in the first auction round. The RFQ is provided to potential suppliers 30 at 204 and the potential suppliers 30 respond to the RFQ at 206. As previously discussed in connection with FIG. 5, the sponsor 10 formulates a rule conditioning the inclusion of a bidder 30 in a subsequent auction round on that bidder 30 having not been awarded a contract in a preceding round. Thus, as desired, the bidder 30 awarded a contract in the first auction round will not participate in the second auction round, and so may not be awarded an additional contract in the second auction round. At 210, the sponsor 10 conducts a first round auction, the outcome of which is an award of a contract to the lowest bidder 30, at 212. That bidder 30 may be given an option at the time of the award to select the quantity of integrated circuits that it will provide under the contract, with the constraints that the awarded bidder 30 must provide between 50% and 70% of the total requirements. Alternately, the awarded bidder 30 may state the maximum quantity of integrated circuits that it can provide prior to commencement of the auction and be awarded the lesser of that maximum quantity or 70% of the sponsor requirement, for example. The contracted quantity of goods may also be provided by utilizing any other known method of making such a determination. The sponsor 10 will then apply the rule that awarded bidders 30 may not participate in subsequent rounds to the second auction round at 214, and conduct a second auction round accordingly. The winning bidder 30 in the second auction round will then be awarded a contract for the remaining quantity of goods required by the sponsor 10.

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing (reverse) auctions, the auction functions can be equally applied to upward pricing (forward) auctions. Thus, it is intended that the present invention cover the modifications and variations of this invention provided they come within the scope of the appended claims and their equivalents.

What is claimed is:

1. A method of conducting an auction comprising:
defining, prior to a first auction, a rule for a second auction based at least in part on user input, the rule limiting participation of bidders in the second auction based on an occurrence in the first auction;
conducting the first auction having a first set of bidders;
designating one or more bidders in the first set of bidders as winners of the first auction;
determining, by a processor, participation of bidders from the first set of bidders in the second auction, in accordance with an application of the rule;
conducting the second auction based on the determined participation; and
designating one or more bidders in the second auction as winners of the second auction;
wherein if the first auction is a forward auction, that which is auctioned in the first and second auctions represents a first portion and a second portion, respectively, of what a seller seeks to sell; and
wherein if the first auction is a reverse auction, that which is auctioned in the first and second auctions represents a first portion and a second portion, respectively, of what a buyer seeks to buy.

2. The method of claim 1, wherein the occurrence includes an outcome of the first auction.

3. The method of claim 1, wherein the rule includes selecting at least two leading bidders from the first auction.

4. The method of claim 3, wherein the rule includes permitting only the at least two leading bidders to participate in the second auction.

5. The method of claim 1, wherein the rule includes not permitting the one or more winners of the first auction to participate in the second auction.

6. The method of claim 1, wherein the bidders are electronically coupled to an auction coordinator during the conducting of the first and second auction.

7. The method of claim 6, wherein the bidders submit bids to the auction coordinator online during the conducting of the first and second auctions.

8. The method of claim 1, wherein the bidders participate in a sealed bid in the first auction and are electronically coupled to an auction coordinator online during the second auction.

9. The method of claim 1, wherein the rule includes permitting only bidders bidding less than a predetermined amount to participate in the second auction.

10. The method of claim 1 wherein the rule includes
determining that a particular bidder may participate in the second auction if that bidder is a leading bidder in a first auction.

11. The method of claim 10, further comprising conducting a third auction including only leading bidders in the first auction.

12. The method of claim 10, further comprising conducting a third auction including only leading bidders in the second auction.

13. The method of claim 10, wherein a plurality of bidders may participate in a subsequent auction.

14. A method of conducting an auction, comprising:
conducting a first auction among a plurality of bidders;
awarding a contract to one or more winners of the first auction; and
conducting a second auction among a set of bidders that only includes those bidders determined by a processor to have not been awarded a contract in the first auction;
wherein if the first auction is a forward auction, that which is auctioned in the first and second auctions represents a first portion and a second portion, respectively, of what a seller seeks to sell; and
wherein if the first auction is a reverse auction, that which is auctioned in the first and second auctions represents a first portion and a second portion, respectively, of what a buyer seeks to buy.

15. The method of claim 14, further comprising soliciting potential bidders.

16. The method of claim 15, wherein soliciting potential bidders includes:
preparing a request for quotation;
providing the request for quotation to potential bidders; and
requesting that potential bidders respond to the request for quotation.

17. The method of claim 16, wherein said request for quotation includes an identification of goods to be purchased.

18. The method of claim 16, wherein said request for quotation includes an identification of services to be purchased.

19. The method of claim 14, further comprising:
awarding a contract to one or more winners of the second auction; and
conducting a third auction among a set of bidders that only includes those bidders that were not awarded a contract in the first auction and bidders that were not awarded a contract in the second auction.

20. A system for conducting an auction, comprising:
a sponsor processor;
a first bidder processor communicating with said sponsor processor; and a second bidder processor communicating with said sponsor processor;

wherein said sponsor processor contains instructions which, when executed by said processor, cause said processor to:

conduct a first auction having a first set of bidders;

designate one or more bidders in the first set of bidders as winners of the first auction;

apply a rule to an occurrence in the first auction, the rule limiting participation of bidders in a second auction based on the occurrence in the first auction;

determine participation of bidders from the first set of bidders in the second auction, in accordance with an application of the rule;

conduct the second auction based on the determined participation; and designate one or more winners of the second auction;

wherein if the first auction is a forward auction, that which is auctioned in the first and second auctions represents a first portion and a second portion, respectively, of what a seller seeks to sell; and wherein if the first auction is a reverse auction, that which is auctioned in the first and second auctions represents a first portion and a second portion, respectively, of what a buyer seeks to buy.

21. The system of claim 20, wherein said first bidder processor and said second bidder processor communicate through an auction coordinator during the first and second auctions.

22. The system of claim 20, wherein said first bidder processor and said second bidder processor communicate through the Internet during the first and second auctions.

23. The system of claim 20 wherein the rule includes permitting only bidders bidding less than a predetermined amount to participate in the second auction.

24. The system of claim 20 wherein the rule includes permitting only bidders bidding more than a predetermined amount to participate in the second auction.

25. The system of claim 20 wherein the rule includes permitting only bidders having best bids that fall within a certain range to participate in the second auction.

26. The system of claim 20 wherein the rule includes permitting only bidders designated as top bidders to participate in the second auction.

27. The system of claim 20 wherein the rule includes permitting only bidders having a desirable geographic location to participate in the second auction.

28. A computer readable storage medium having stored thereon instructions which, when executed by a processor, cause the processor to:

conduct a first auction having a first set of bidders;

apply a rule to an occurrence in the first auction, the rule limiting participation of bidders in a second auction based on the occurrence in the first auction; and conduct the second auction based on the determined participation;

wherein if the first auction is a forward auction, that which is auctioned in the first and second auctions represents a first portion and a second portion, respectively, of what a seller seeks to sell; and wherein if the first auction is a reverse auction, that which is auctioned in the first and second auctions represents a first portion and a second portion, respectively, of what a buyer seeks to buy.

29. A bidding device operated by a bidder during an online auction, said bidding device comprising:

a memory configured to store one or more bids received from the bidder; and a communication interface configured to submit the one or more bids to a sponsor processor during a first auction;

wherein the sponsor processor is configured to apply a rule to an occurrence in the first auction, the rule limiting participation of bidders in a second auction based on the occurrence in the first auction; and wherein the bidding device is selectively enabled to determine participation of the bidder in the second auction in accordance with an application of the rule, and to allow the bidder to submit bids to the sponsor processor in the second auction based on the determined participation;

wherein if the first auction is a forward auction, that which is auctioned in the first and second auctions represents a first portion and a second portion, respectively, of what a seller seeks to sell; and wherein if the first auction is a reverse auction, that which is auctioned in the first and second auctions represents a first portion and a second portion, respectively, of what a buyer seeks to buy.

30. The bidding device of claim 29, wherein the bidding is enabled to allow the bidder to submit bids to the sponsor processor in the second auction only if the bidder has not been awarded a contract in the first auction.

* * * * *